United States Patent
Lampe-Juergens et al.

(10) Patent No.: US 11,815,388 B2
(45) Date of Patent: Nov. 14, 2023

(54) METHOD AND SYSTEM FOR TIMELY DETECTING GAS PRESSURE IRREGULARITIES USING A GAS METER IN A POWER EFFICIENT MANNER

(71) Applicant: Honeywell International Inc., Charlotte, NC (US)

(72) Inventors: Christian Lampe-Juergens, Spelle (DE); Andreas Wuchrer, Georgsmarienhütte (DE); Ralf Schroeder Genannt Berghegger, Glandorf (DE); Norbert Flerlage, Löningen (DE); Tobias Meimberg, Osnabrück (DE)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 33 days.

(21) Appl. No.: 17/108,439

(22) Filed: Dec. 1, 2020

(65) Prior Publication Data
US 2022/0170773 A1 Jun. 2, 2022

(51) Int. Cl.
*G01F 3/22* (2006.01)
*G01F 25/10* (2022.01)

(52) U.S. Cl.
CPC ............... *G01F 3/22* (2013.01); *G01F 25/10* (2022.01)

(58) Field of Classification Search
CPC ..... G01F 3/22; G01F 3/20; G01F 3/00; G01F 7/00; G01F 7/005; G01F 9/00;
(Continued)

(56) References Cited

U.S. PATENT DOCUMENTS

| | | | |
|---|---|---|---|
| 4,918,995 A | | 4/1990 | Pearman et al. |
| 5,677,480 A | * | 10/1997 | Liyanage ............ G01M 3/2876 73/37 |

(Continued)

FOREIGN PATENT DOCUMENTS

| | | | |
|---|---|---|---|
| CN | 110220566 A | * | 9/2019 |
| JP | 2004108832 A | * | 4/2004 |

(Continued)

OTHER PUBLICATIONS

Wikipedia Contributors. (Oct. 29, 2020b). Slope. Wikipedia. Retrieved Apr. 11, 2022, from https://web.archive.org/web/20201029054835/https://en.wikipedia.org/wiki/Slope (Year: 2020).*

(Continued)

*Primary Examiner* — Daniel R Miller
*Assistant Examiner* — Eric Sebastian Von Wald
(74) *Attorney, Agent, or Firm* — Seager, Tufte & Wickhem, LLP (57) ABSTRACT

Devices, methods, and systems for operating gas meters are described herein. The systems may include a gas measuring system connectable to a gas line, where the gas measuring system may include a flow rate sensor, a pressure sensor, and a controller in communication with the flow rate sensor and the pressure sensor. The flow rate sensor and the pressure sensor may be configured to sense measures of a gas passing through the gas line. The controller may repeatedly obtain pressure measurements at set pressure measurement times. Measures from the flow sensor may be monitored and when a measure from the flow sensor measure meets a flow rate criteria, the controller may trigger an extra pressure measurement without waiting for a next pressure measurement time. The controller may initiate closing of a gas valve when a measure from the pressure sensor exceeds a threshold value.

20 Claims, 7 Drawing Sheets

(58) Field of Classification Search
CPC .......... G01F 9/001; G01F 25/10; G01F 25/00; G01F 25/0084; G01F 25/0092; G01F 25/15; G06F 9/3005; G06F 8/433; G01L 23/00; H01H 11/0062; H01H 33/563; G01K 2205/02; G01K 2205/04; G01R 31/2829; G05D 23/1353; G05D 16/00; G05D 16/028; G05D 11/132; G05D 16/0608; G05D 7/00; G05B 2219/41303; G05B 2219/41108; B01L 2400/082; B01L 2400/00; B01L 2400/084; B67D 1/1277; B67D 7/048; B67D 7/52

See application file for complete search history.

(56) References Cited

U.S. PATENT DOCUMENTS

| | | | |
|---|---|---|---|
| 6,343,617 B1* | 2/2002 | Tinsley | G05D 7/0635 |
| | | | 137/486 |
| 8,994,552 B2 | 3/2015 | Jiang et al. | |
| 9,355,477 B2 | 5/2016 | Ashley et al. | |
| 9,366,595 B2 | 6/2016 | Bourgeois | |
| 9,557,899 B2 | 1/2017 | McGreevy et al. | |
| 10,533,882 B2 | 1/2020 | Iliev et al. | |
| 10,571,358 B2 | 2/2020 | Campan et al. | |
| 10,663,333 B2 | 5/2020 | Iliev | |
| 2009/0183549 A1* | 7/2009 | Monkowski | G01F 25/17 |
| | | | 73/861.52 |
| 2013/0013261 A1 | 1/2013 | Niessen et al. | |
| 2015/0276433 A1 | 10/2015 | Brahmajosyula et al. | |
| 2016/0305677 A1* | 10/2016 | Hirsch | F24F 11/0001 |
| 2018/0031142 A1* | 2/2018 | Hillo | F16K 31/041 |
| 2018/0253111 A1* | 9/2018 | Goto | G01F 15/005 |
| 2018/0316987 A1 | 11/2018 | Artiuch et al. | |

FOREIGN PATENT DOCUMENTS

| | | | |
|---|---|---|---|
| JP | 2004144641 A | * | 5/2004 |
| JP | 2016038308 A | * | 3/2016 |
| JP | 2020187081 A | * | 11/2020 |
| KR | 20110022877 A | | 3/2011 |
| KR | 1153173 B1 | | 7/2012 |
| RU | 2315959 C1 | * | 1/2008 |
| WO | 2007037616 A1 | | 4/2007 |
| WO | 2013156945 A1 | | 10/2013 |

OTHER PUBLICATIONS

AC-250NX Diaphragm Meter, Honeywell International, Nebraska, 4 pages, 2019.
Mass Flow Meter and Controller, Pressure Controller Red-y Smart Series, Vötglin Instruments AG—Switzerland, 56 pages, 2019.
Maquette Dialogaz II, Notice Utilsateur, Landis and Gyr, 14 pages, 1996.
Red-y Compact 2 Series, EN A1-8, Vötglin Instruments, AG—Switzerland, 47 pages, 2016.
Red-y Compact Series Operating Instructions, Vötglin Instruments AG, Switzerland, 41 pages, 2015.
Smart Metering Implementation Progamme, Version 1.1, Department of Energy and Climate Change, Crown , 59 pages, 2014.

* cited by examiner

FIG. 7

METHOD AND SYSTEM FOR TIMELY DETECTING GAS PRESSURE IRREGULARITIES USING A GAS METER IN A POWER EFFICIENT MANNER

TECHNICAL FIELD

The present disclosure relates generally to gas meters, and more particular to gas meters used in a gas distribution system.

BACKGROUND

Installed residential and commercial gas meters are often configured to measure a flow rate of gas through a gas line using a flow rate sensor, but are often not configured to sense a pressure in the gas line. Newer gas meter installations, however, can include a pressure sensor to sense pressure in the upstream gas line. Such gas meters may be configured to measure a flow rate and/or pressure in the gas line at predetermined measurement times or intervals. Since gas meters are typically powered by a battery, and because the pressure sensor measurements can consume significant power, the pressure measurements are typically only performed at relatively long intervals. This, in turn, can result in a relatively large latency in detecting a gas pressure irregularity, which can delay closure of a gas valve intended to protect the downstream system in response. What would be desirable are methods and system for timely detecting gas pressure irregularities using a gas meter but in a more power efficient manner.

SUMMARY

The present disclosure generally relates to methods and system for timely detecting gas pressure irregularities using a gas meter in a power efficient manner.

In one example, a gas measuring system may include a flow rate sensor, a pressure sensor, and a controller in communication with the flow rate sensor and the pressure sensor. The flow rate sensor may be configured to sense a measure of flow rate of a gas passing through a gas line. The pressure sensor may be configured sense a measure of pressure of the gas passing through the gas line. The controller may be configured to repeatedly obtain a pressure measurement of the measure of pressure of the gas passing through the gas line at regular pressure measurement times. Further, the controller may monitor the measure of flow rate of the gas passing through the gas line, and when the measure of flow rate meets one or more predetermined flow rate criteria, trigger an extra pressure measurement without waiting for a next regular pressure measurement time. When the gas measurement system is battery powered, the regular pressure measurement times may be set such that a desired expected battery lifetime is achieved.

In another example, a gas meter may include a flow rate sensor, a pressure sensor, and a controller. The flow rate sensor may be configured to sense a measure of flow rate of a gas passing through the gas meter. The pressure sensor may be configured sense a measure of pressure of the gas passing through the gas meter. The controller may be configured to obtain a pressure measurement of the measure of pressure of the gas passing through the gas meter at each of a plurality of regular pressure measurement times and monitor the measure of flow rate of the gas passing through the gas meter. When the measure of flow rate meets one or more predetermined flow rate criteria, the controller may trigger an extra pressure measurement without waiting for a next regular pressure measurement time. When the measure of flow rate does not meet the one or more predetermined flow rate criteria, an extra pressure measurement may not be triggered by the controller.

In a further example, a non-transient computer readable medium storing instructions that when executed by a processor may cause the processor to determine a value related to a flow rate of a gas flow based on a measure from a flow rate sensor sensing a measure related to the flow rate of the gas flow, and compare the value related to the flow rate of the gas flow to one or more flow rate criteria. When the value related to the flow rate satisfies one or more of the flow rate criteria, the instructions may cause the processor to activate a pressure sensor to a higher power measurement state and determine a value related to a pressure of the gas flow. When the value related to the flow rate does not satisfy the one or more flow rate criteria, the instructions may cause the processor to leave the pressure sensor in a lower power sleep state.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE DRAWINGS

The disclosure may be more completely understood in consideration of the following description of various examples in connection with the accompanying drawings, in which.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic is described in connection with an embodiment, it is contemplated that the feature, structure, or characteristic may be applied to other embodiments whether or not explicitly described unless clearly stated to the contrary.

Many currently installed commercial and residential gas meters include flow sensors and are battery powered, but do not have pressure sensors for sensing or determining a pressure in a gas line with which the gas meters are connected. To address safety concerns and better monitor and/or control a flow through a gas line, newer gas meters are being equipped with capabilities that allow for determining pressure sensing or otherwise determining pressure in the gas line. Due to power limitations (e.g., batteries have a limited life) and/or processing limitations, these gas meters may be restricted to determining pressure values within the gas line only at a predetermined interval. In some cases, the predetermined interval may be set to one (1) minute or longer.

Safety standards or other guidelines and/or requirements may set forth reactions times for closing safety valves when there is a low or a high pressure in the gas line. In one example, guidelines or requirements may set a reaction time for closing a valve at ten (10) seconds. In the example, if it takes about five (5) seconds to close a valve, a pressure determination (e.g., a reading and a comparison to a threshold) may need to be completed about ever two (2) seconds. As such, in some cases (e.g., when the predetermined interval is set to one (1) minute), an actual reaction time of the gas meter system to close a gas control valve in response to a detected high pressure may be longer than the reaction time prescribed by guidelines and/or requirements. A solution in which the reaction time prescribed by the guidelines and/or requirements may be met while meeting power and/or processing requirements is desired.

To facilitate meeting prescribed reaction times, flow rate data from the flow sensor of the gas meter may be utilized to trigger additional pressure measurements (e.g., additional to the measurements at the predetermined times or intervals) when a potential atypical pressure condition is detected. Gas meters may be configured to sense a flow rate of a flow in a gas line at a predetermined interval (e.g., at or about ever two (2) seconds and/or at other suitable times). The gas meter may use the sensed flow rate data to identify flow conditions in the gas line that may be indicative of an atypical pressure condition in the gas line and trigger an pressure reading in addition to the pressure readings at the predetermined interval for sensing a pressure measurement. In this and other similar manners, gas meters may be able to meet reaction times set forth in guidelines and requirements, and do so from an energy and processing efficiency perspective.

Figure 1:
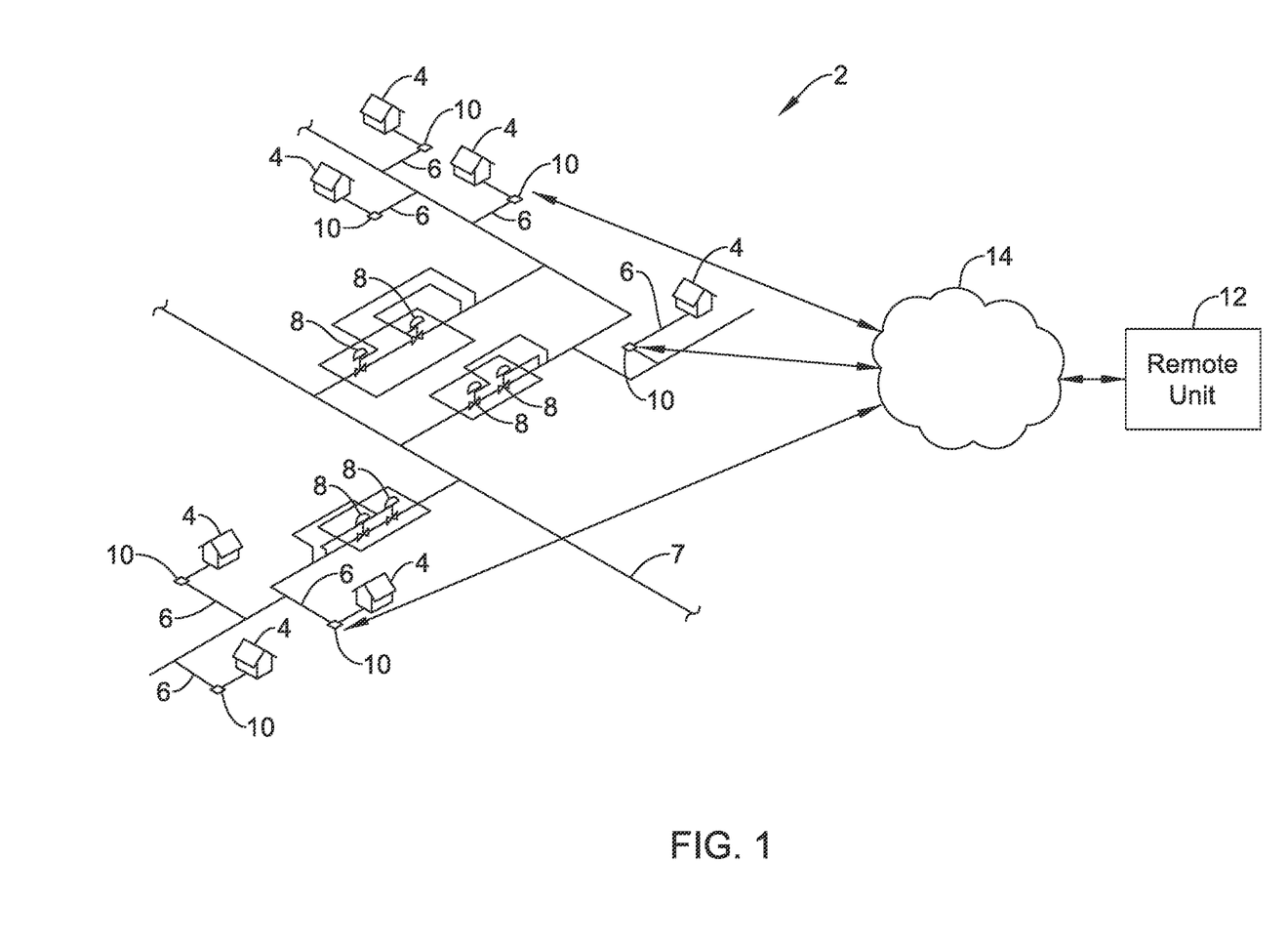
FIG. 1 is a schematic diagram of an illustrative gas metering system.

Turning to the Figures, FIG. 1 depicts an illustrative gas meter system 2 implemented in a residential setting having one or more houses 4. Near each house, a gas meter 10 may be installed to measure the quantity of gas consumed by that house, often for billing purposes. In some cases, a regulator may be installed near the gas meter 10 to reduce or limit a pressure in a gas line 6 feeding the corresponding house 4. One or more regulator stations 8 may be located upstream of the gas meters 10 as shown.

The gas line 6 may be configured to connect the gas meter, the regulators, and/or the regulator station. As depicted in FIG. 1, the gas line 6 may include an upstream main gas line 7 of the gas distribution system that feeds one or more regulator stations 8. The regulator stations 8 then feed one or more downstream regulators and/or gas meters 10 at each house 4. This is just one illustrative configuration.

In some cases, the gas meter system 2 may include a remote unit 12 (e.g., a head-end system and/or other suitable remote unit), which may be in communication with the gas meters 10, the regulators, and/or the regulator stations 8 over one or more networks 14 (e.g., LANs, WANs, HANs, etc.). The remote unit 12 may be hardware and/or software that receives data from the gas meters 10 and/or other components of the gas meter system 2. Although not required, the remote unit 12 may be located at a gas utility and/or at one or more other suitable locations. In some cases, the remote unit 12 may perform data analysis and/or push received data to one or more other systems and/or components.

Figure 3:
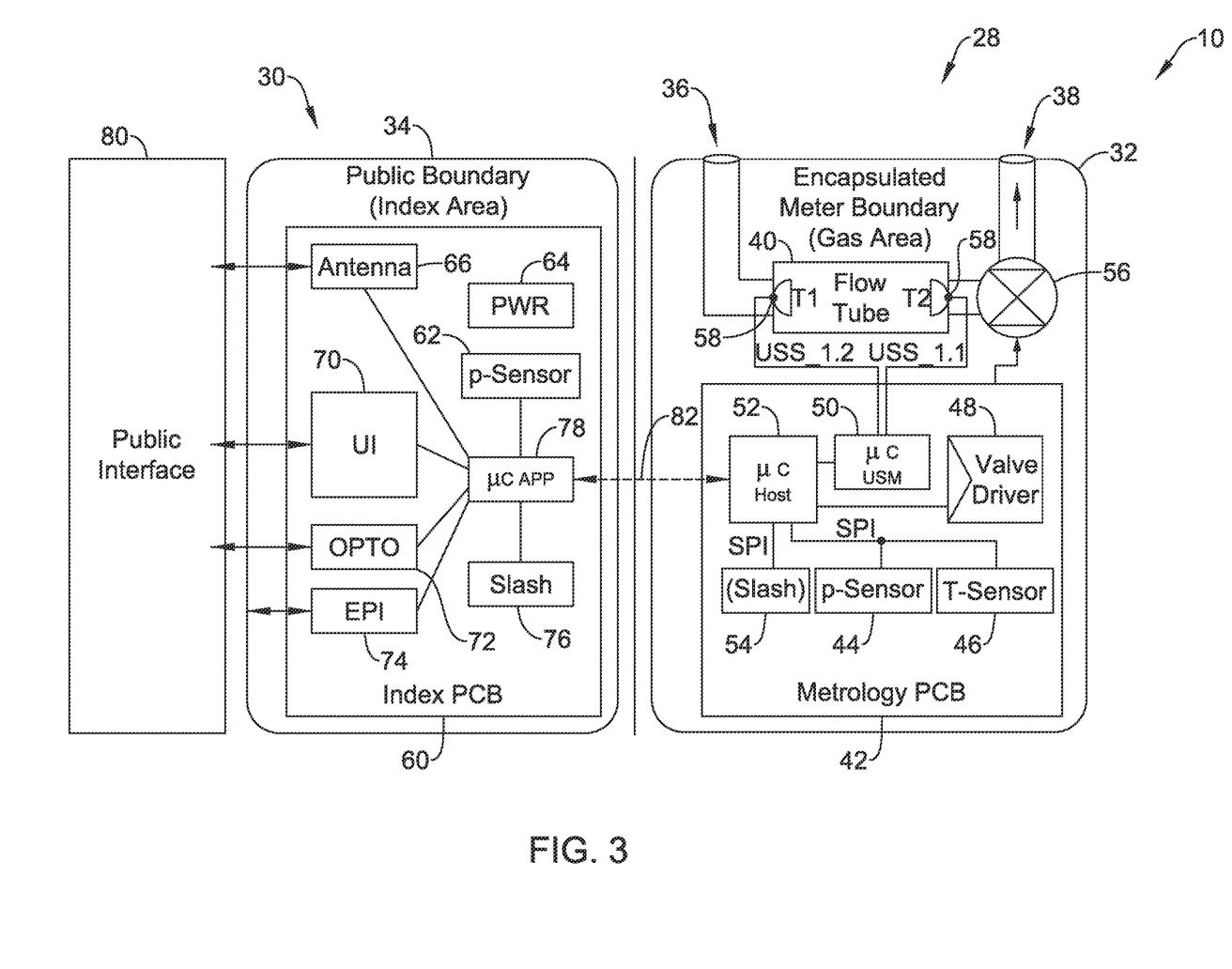
FIG. 3 is a schematic block diagram of an illustrative gas meter system.

The gas meter 10 may be configured in any suitable manner. In some cases, the gas meter 10 may include one or more pressure sensors (e.g., absolute pressure sensors and/or other suitable pressure sensors). In an example configuration, one of the pressure sensors may be in an electronic index (e.g., as shown in FIG. 3 and discussed below) and configured to output measures indicative of an ambient pressure, while the other pressure sensor may be within a metrology unit of the gas meter 10 that is connectable to the electronic index and may be configured to output measures indicative of a sum of the ambient pressure and a net pressure in the gas line 6. The gas meter 10 may calculate a pressure difference between the two pressure sensors when both are included to obtain a current net pressure within the gas meter 10 and gas line 6. Typically, the net pressure within the gas meter 10 may be in a range of about twenty (20) millibars (mbar) to thirty (30) mbar (e.g. 0.3 pressure per square inch (PSI) to 0.45 PSI).

The gas meter 10 may be able to measure flow rate of a flow through the gas line 6. The flow rate may be calculated using a delta time of flight measurement and/or calculated in one or more other suitable manner. For example, a delta time of flight may be determined from:

$$\Delta T = T_{21} - T_{12} = \frac{2Lv}{(c^2 - v^2)} \tag{1}$$

Where $\Delta T$ is the delta time of flight between an upstream location and a downstream location, $T_{21}$ is an absolute time of flight from a second point (e.g., a second transducer) to a first point (e.g., a first transducer) (see FIG. 3), $T_{12}$ is an absolute time of flight from the first point to the second point, L is a length from the first point to the second point, v is a speed of travel of the flow, and c is a speed of sound of the measured fluid. These time of flights may be determined using an ultrasonic measuring unit (USM) or the like. From the delta time of flight, $\Delta T$, the speed, v, of the flow may be calculated:

$$v = \frac{L}{2}\left(\frac{\Delta T}{T_{21}T_{12}}\right) \quad (2)$$

$$Q = v*A \quad (3)$$

where A is a cross-sectional area of a flow tube in which the flow that is being measured flows (e.g. flow tube of the USM).

In some cases, the gas meter 10 may be configured to calculate a speed of sound in the gas (e.g., an absolute time of flight measurement and/or other suitable time of flight calculation) to be used in the delta time of flight measurement shown in equation (1). The speed of sound may depend on the gas, air, or a combination of gas and air inside the gas meter 10. The speed of sound for air is about 340 meters (m)/second (s). The speed of sound for methane is about 430 m/s. As such, a composition of both air and methane may have a speed of sound between 340 m/s and 430 m/s depending on the concentrations of the composition. Based on such information and/or other suitable information, the gas meter 10 may determine its internal net pressure and flow rate of the flow in the gas line 6.

Figure 2:
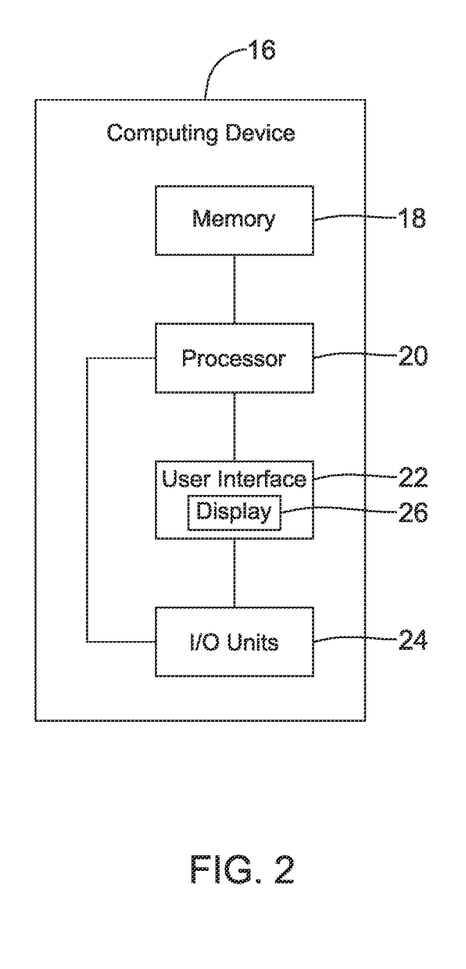
FIG. 2 is a schematic block diagram of an illustrative computing device.

The gas meter 10, the remote unit 12 and/or other suitable computing components of the gas meter system 2 may be and/or may include one or more computing devices. FIG. 2 depicts a schematic diagram of an illustrative computing device 16. The computing device 16 may represent all or part of one or more of the regulator station 8, the gas meter 10, the remote unit 12, the network 14, and/or one or more other computing device components of or associated with the gas meter system 2. Although not shown, the computing device 16 may include a clock and/or a timer. The computing device 16 may be and/or may be part of, for instance, a smart phone, a tablet, a personal digital assistant (PDA), a personal computer, a motor, a network device, a light source, a controller, a sensor, a switch, a remote server, a network device, a router, a modem, and/or other suitable computing device. However, configurations of the present disclosure are not limited to a particular type of computing device 16. In some cases, the computing device 16 may include memory 18, one or more processors 20, one or more user interfaces 22, one or more input/output (I/O) units 24, and/or one or more other suitable computing components.

The memory 18 may be any type of storage medium that can be accessed by the processor 20 to perform various examples of the present disclosure. For example, the memory 18 may be a non-transitory computer readable medium having computer readable instructions (e.g., computer or application program instructions, application program code of a mobile application or software, control algorithm software, and/or other suitable instructions) stored thereon that are executable by the processor 20 for performing one or more methods described herein.

The memory 18 may be volatile or nonvolatile memory. The memory 18 may also be removable (e.g., portable) memory, or non-removable (e.g., internal) memory. For example, the memory 18 may be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although the memory 18 is illustrated as being located in the computing device 16, embodiments of the present disclosure are not so limited. For example, the memory 18 may also be located internal to another computing resource (e.g., enabling computer readable instructions to be downloaded over the Internet or another wired or wireless connection).

The processor 20 of the computing device 16 may include a single processor or more than one processor working individually or with one another (e.g., dual-core, etc.). The processor 20 may be configured to execute instructions, including instructions that may be loaded into the memory 18 and/or other suitable memory. Example processor components may include, but are not limited to, microprocessors, microcontrollers, multi-core processors, graphical processing units, digital signal processors, application specific integrated circuits (ASICs), field programmable gate arrays (FPGAs), discrete circuitry, and/or other suitable types of data processing devices.

The user interface 22, when provided, may be any suitable user interface and/or user interface components configured to facilitate a user of the computing device 16 interacting with the computing device 16 via the user interface 22. For example, the user interface 22 may be used to provide information to and receive information from the user of the computing device 16. For instance, the user interface 22 may display volume data, flow rate data, and/or other suitable data related to a flow through a gas line and/or receive selections of settings for sensing and/or monitoring a flow through the gas line. The user interface 22 may include a keyboard or keyboard functionality, a pointer (e.g., a mouse, touch pad, or touch ball) or pointer functionality, a microphone, a speaker, a light system, a haptic system, a camera, a video camera, selectable buttons, adjustable dials, and/or other suitable user interface features the user may use to input information into and/or receive information from the computing device 16. Configurations of the present disclosure, however, are not limited to a particular type(s) of user interface 22.

In some cases, the user interface 22 may include a graphical user interface (GUI) that may have a display 26 (e.g., a screen) that may provide and/or receive information to and/or from the user of the computing device 16. The display 26 may be, for instance, a touch-screen (e.g., the GUI may include touch-screen capabilities). In some cases, the user interface may be part of another device (e.g. cell phone) that is in wireless communication with the computing device 16.

The I/O unit 24 may be and/or include any type of communication port(s) and may facilitate wired and/or wireless communication with one or more networks. In one example, the I/O unit 24 may facilitate communication with one or more networks and/or other devices through any suitable connection including, but not limited to, radio communication, Ethernet, cellular communication, ZigBee, REDLINK™, Bluetooth, Bluetooth Low Energy (BLE), WiFi, IrDA, dedicated short range communication (DSRC), EnOcean, Near Field Communication (NFC), and/or any other suitable common or proprietary wired or wireless protocol. In one example, the I/O unit 24 may at least include a port configured to communicate over the network 14 with one or more components of or in communication with the gas meter system 2.

FIG. 3 is a schematic diagram of an illustrative gas meter 10. The gas meter 10 may include a metrology unit 28 (e.g., a first unit) and an index unit 30 (e.g., a second unit). In some cases, the index unit 30 may be in communication with the metrology unit 28 unit and may be releasably connected (e.g., releasably mechanically connected and/or releasably electrically connected) to the metrology unit 28. The communication connection between the metrology unit 28 and the index unit 30 may be a wired and/or wireless connection. In some cases, a metrology housing 32 may entirely or at least partially define an encapsulated meter boundary.

The gas meter 10 may include a single housing or two or more housings. In one example, as depicted in FIG. 3, the gas meter 10 may include the metrology housing 32 configured to at least partially house all or at least one of the components of the metrology unit 28 and an index housing 34 configured to at least partially house all or at least one of the components of the index unit 30.

The metrology unit 28 may include an inlet 36 for receiving a flow from a gas line (e.g., the gas line 6 and/or other suitable gas line) and an outlet 38 for returning the flow to the gas line. A flow tube 40 may extend at least partially between the inlet 36 and the outlet 38 and receive the flow. Although not required, the flow tube 40 may facilitate sensing pressures and/or flow rates of the flow through the gas line 6 (e.g., by sampling the flow of the gas line through the flow tube 40).

The metrology unit 28 may include one or more metrology printed circuit boards (PCBs) 42 in communication with one or more electronic components of the metrology unit 28. For example, the metrology PCB 42 may include and/or be in communication with a metrology pressure sensor 44, a metrology temperature sensor 46, a valve driver 48, an ultrasonic measuring unit (USM) microcontroller 50, a host microcontroller 52, a metrology slash 54, and/or other suitable electronic components. Although not depicted, the metrology unit 28 may include a power source, such as a battery. Alternatively or additionally, the metrology unit 28 may include line power, may be power by a batter of the index unit 30, and/or may be powered in one or more other suitable manners (e.g., solar power, wind power, etc.)

The host microcontroller 52 may be in communication with the valve driver 48 and the USM microcontroller 50. For example, the host microcontroller 52 may be configured to send control signals to the valve driver 48 to open and/or close, or otherwise adjust, a gas valve 56 of the metrology unit 28 to facilitate causing a flow to flow through the flow tube 40 and/or the gas line 6.

The USM microcontroller 50 may be in communication with one or more flow rate sensors configured to sense one or more measures indicative of a flow rate of flow through the flow tube 40. In some cases, the host microcontroller 52 may be configured to send control signals to the USM microcontroller 50 to receive flow sensor measurements from the USM microcontroller 50. Although not required, the control signal sent from the host microcontroller 52 to the USM microcontroller 50 may cause the USM microcontroller to initiate sensing measures related to the flow rate of a flow through the flow tube 40.

The host microcontroller 52 and the USM microcontroller 50 may be any suitable type of microcontroller. For the example the host microcontroller 52 and/or the USM microcontroller 50 may include a processor (e.g., the processor 20 and/or other suitable processor) and memory (e.g., the memory 18 and/or other suitable memory).

The host microcontroller 52 may be in communication with the temperature sensor 46. In response to receiving control signals and/or at one or more other suitable times, the temperature sensor 46 may send sensed measurements related to temperature to the host microcontroller 52. In some cases, the sensed temperature measurements may be related to a temperature of the flow through the flow tube 40 (e.g., a temperature sensed in the flow tube, a temperature sensed in the metrology housing 32, etc.) and may be used to adjust or correct flow rate data of flow through the flow tube 40.

The host microcontroller 52 may be in communication with the metrology pressure sensor 44. In response to receiving control signals, at one or more regular pressure measurement times or intervals (e.g., ever 30 seconds, ever minutes, every two minutes, etc.), and/or at one or more other suitable times, the metrology pressure sensor 44 may sense pressure and may send sensed measurements related to pressure to the host microcontroller 52. The metrology pressure sensor 44 may be in a low power state when it is not taking or scheduled to take pressure measurements and then may be activated to a high power measurement state when the pressure sensor 44 is taking or scheduled to take pressure measurements.

In some cases, the sensed pressure measurements may be related to a pressure of the flow through the flow tube 40 (e.g., sensed pressure in the flow tube 40, a sensed pressure in a metrology housing 32, a net pressure, etc.). In one example, the sensed pressure measurements from the metrology pressure sensor 44 may be indicative of a combined pressure of the ambient pressure and the net pressure in the gas line 6.

The host microcontroller 52 may be in communication with the slash 54, which may store calculated values of flow rate of the flow through the gas line over time. In response to receiving control signals and/or at one or more other suitable times, the slash 54 may send summed values of flow rates over a predetermined time to the host microcontroller 52 for use in generating an average flow rate over the predetermined time period.

As discussed, the gas meter 10 may include the index unit 30. The index unit 30 may include one or more indexing PCBs 60 in communication with one or more electronic components of the index unit 30. For example, the indexing PCB 60 may include and/or be in communication with an index pressure sensor 62, an index power source 64, an antenna 66, a user interface 70, an optical communication interface 72, an electronic production interface 74, an index slash 76, an application microcontroller 78, and/or other suitable electronic components.

The power source 64 of the index unit 30 may be any suitable type of power source configured to power the index unit 30 and/or the metrology unit 28 when the metrology unit 28 does not include a power source. In some cases, the index power source 64 may be or include a battery. Alternatively or additionally, the power source 64 may be line power and/or may be one or more components configured to facilitate powering the index unit 30 in one or more other suitable manners (e.g., solar power, wind power, etc.)

The application microcontroller 78 may be in communication with the index pressure sensor 62. In response to receiving control signals, at one or more regular pressure measurement times (e.g., ever 30 seconds, ever minutes, every two minutes, etc.), and/or at one or more other suitable times, the pressure sensor 62 may sense pressure and send sensed measurements related to pressure to the application microcontroller 78. The index pressure sensor 62 may be in a low power state (e.g., a sleep state and/or other suitable low power state) when it is not taking or scheduled to take pressure measurements and then may be activated to a high power measurement state when the index pressure sensor 62 is taking or scheduled to take pressure measurements.

In addition to storing the values from or related to the index pressure sensor 62, the application microcontroller 78 may be configured to store additional and/or alternative information in the index slash 76. Other information that may be stored and/or retrieved in the index slash 76 by the application microcontroller 78 may include, but is not limited to, alarm records, readings from other sensors (e.g., including readings from sensors of the metrology unit 28), calculations based on readings, and/or other suitable information.

The antenna 66, the user interface 70 (e.g., the user interface 22 and/or one or more other suitable user interfaces), the optical communication interface 72, and the electronic production interface may facilitate a public interface 80 (e.g., facilitate interactions with the gas meter 10 by local users, such as technicians or others, and/or remote users, such as users at the remote unit 12 and/or other remote units). The antenna 66 may be configured for any suitable wireless communication protocol including, but not limited to, Zigbee, Mbus, GMS, radio frequency (RF), near-field communication (NFC), Bluetooth, Bluetooth Low Energy (BLE), and/or other suitable communication protocols. The user interface 70 may be configured similar to or different than the user interface 22 discussed above. In some cases, the user interface 70 may include a display, one or more switches, one or more speakers for sounding alarms and/or for other purposes, and/or one or more other suitable components. In some instances, the optical communication interface 72 may be used by meter operators to obtain data from the gas meter 10, to change settings on the gas meter 10, to open the gas meter 10, and/or for one or more other suitable purposes. The electronic production interface 74 may be used during production of the gas meter 10 to initially configure the gas meter 10 and/or may be used for one or more other suitable purpose.

The metrology unit 28 and the index unit 30 may be configured to communicate with each other via a wired and/or wireless connection. In one example, as depicted in FIG. 3, the metrology unit 28 and the index unit 30 may communicate over a metrology communication interface (MCI) 82, which may extend from the metrology PCB 42 to the index PCB 60 and/or extend between components thereof. In some cases, the MCI 82 may extend from input/output ports of the metrology unit 28 that are coupled to a terminal block of the metrology unit 28 to input/output ports of the index unit 30 that are coupled to a terminal block of the index unit 30. In some cases, the terminal block of the metrology unit 28 may be releasably mechanically connected to the terminal block of the index unit 30 such that the index unit 30 may be releasably coupled to the metrology unit 28.

In some cases, the index unit 30 may communicate pressure sensed by the index pressure sensor 62 at the index unit 30 to the metrology unit 28 over the MCI 82. The metrology unit 28 may utilize values from the index pressure sensor 62 to determine a net pressure of the gas meter 10 by subtracting values from the index pressure sensor 62 from values of the metrology pressure sensor 44. The net pressure may be utilized to correct or adjust the flow rate values of the flow through the flow tube 40 for pressure changes. Additionally or alternatively, the net pressure or values based on the net pressure may be compared to one or more threshold to identify an atypical pressure condition in the gas line 6 and facilitating taking control actions in response to the identified atypical pressure condition in the gas line.

Figure 4:
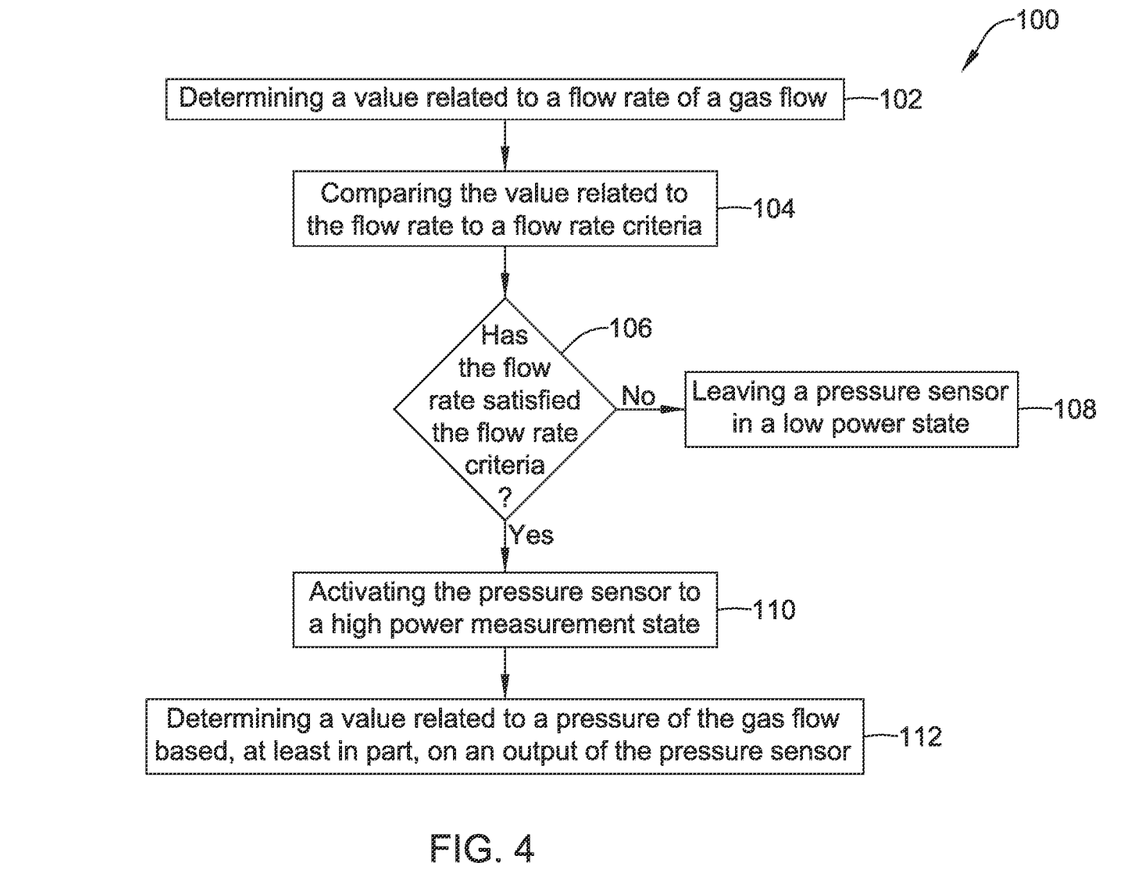
FIG. 4 is a schematic diagram of an illustrative method of operating a gas meter system.

FIG. 4 is a schematic flow diagram of a method 100 for activating one or more pressure sensors (e.g., the pressure sensor 44, the pressure sensor 62, and/or other suitable pressure sensors) to take a measurement indicative of a pressure in a gas line (e.g., the gas line 6 and/or other suitable gas line). In one example, the method may be configured to activate two pressure sensors, such as a first pressure sensor measuring an ambient pressure and a second pressure sensor measuring ambient pressure and gas line net pressure, but this is not required.

In some cases, the method 100 may be entirely or at least partially executed using a gas meter (e.g., the gas meter 10 and/or other suitable gas meter). A controller (e.g., the host microcontroller 52, the USM microcontroller 50, and/or other suitable controllers) of the gas meter may be configured to entirely or at least partially initiate sensor measurements, make calculations, make determinations, initiate control signals, and/or take one or more suitable actions to effect the method 100.

The pressure sensor may have a lower power state and a higher power state, where the higher power state may be a state in which the pressure sensor is taking a measurement and the lower power state may be a state in which the pressure sensor is not taking a measurement. In one example, when the pressure sensor is not taking a pressure measurement, the pressure sensor may be kept in or remain in a lower power state to save power, but this is not required. In some cases, the lower power state corresponds to a sleep mode. In some cases, the lower power state corresponds to an "off" mode where the pressure sensor is powered off.

The method may include determining 102 a value related to a flow rate of a gas flow through a gas line (e.g., the gas line 6 and/or other suitable gas line). When executed using the gas meter, the flow rate value may be determined based on readings from a flow rate sensor (e.g., the flow rate sensors 58 and/or other suitable flow rate sensors) of the metrology unit (e.g., the metrology unit 28 and/or other suitable metrology units) taken at each of or over one or more predetermined times or intervals (e.g. at two (2) second increments and/or other suitable time increments). In one example, the generated flow rate value may be a volumetric flow rate value and may be calculated based on Equations (1)-(3) discussed herein. Other techniques for determining flow rate values are contemplated, including, but not limited to, determining averages of flow rate values over time, determining slopes of flow rate values over time, compensating flow rate values (e.g., compensating for gas conditions, such as temperature and/or pressure). Although not required, the gas meter may store the flow rate values and related data, including times at which the flow rate is sampled, in memory (e.g., the memory 18, the slash 54, the slash 76, and/or at one or more other suitable locations including memory).

The method 100 may further include comparing 104 the determined value related to the flow rate to a flow rate criteria. The flow rate criteria may be any suitable criteria including, but not limited to, one or more thresholds. Example thresholds may include a low flow rate threshold, a high flow rate threshold, a flow rate slope threshold, a flow rate average threshold, and/or one or more other suitable thresholds. In one example of a threshold, the flow rate value determined may be a slope (e.g. change) over a predetermined time period (e.g., a set amount of time, a set number of measurements, etc.) and may be compared to a flow rate threshold corresponding to a potential high-pressure condition in the gas line.

As a result of the comparing 104 of the determined value related to the flow rate criteria, a decision or determination 106 is made as to whether the determined flow rate value has satisfied the flow rate criteria. When the flow rate criteria corresponds to a threshold, it may be considered to be met when the determined flow rate value meets and/or goes beyond the threshold.

One example of comparing flow rate values to flow rate criteria may include comparing a flow rate slope value to a flow rate slope threshold and/or comparing a flow rate magnitude to a flow rate magnitude threshold. In this example, if one or both of the flow rate slope meets or exceeds the flow rate slope threshold and/or the flow rate magnitude meets or exceeds the flow rate magnitude threshold, it may be determined that the flow rate criteria has been met. This is just one example, and it should be recognized that any suitable threshold may be used.

When a decision has been made that the flow rate has not met the flow rate criteria, the pressure sensor may be maintained, returned, and/or left 108 in a lower power measurement state. Leaving the pressure sensor in the lower power measurement state may facilitate reducing power consumption by the gas meter and/or reducing processing power requirements for the gas meter, thereby potentially increasing the battery life of the gas meter when powered by a battery.

When a decision has been made that the flow rate determined has met the flow rate criteria, the pressure sensor may be activated 110 to a higher power measurement state. In one example, if a decision is made that the determined flow rate value meets or exceeds a higher flow rate threshold (e.g., a high flow rate slope threshold and/or other suitable high flow threshold), the pressure sensor may be activated or placed in a higher power measurement state and take one or more pressure related measurements. Activating the pressure sensor to the higher power measurement state when flow rate values are indicating an irregular pressure condition of interest (e.g., a high pressure condition or low pressure condition) is present in the gas line may facilitate monitoring pressure in the gas line using energy efficient techniques, while meeting or exceeding latency or response time requirements and/or guidelines for gas line pressure monitoring.

Based, at least in part, on one or more measurements that are obtained from (e.g., outputted from) the pressure sensor after or in response to activating or placing the pressure sensor in the higher power measurement state, a value related to a pressure of the gas flow in the gas line may be determined 112. The determined value related to the pressure of the gas flow may be used by the gas meter in or more suitable manners. In one example, the value related to the pressure of the gas flow may be used by the gas meter to determine if a pressure-related threshold has been met. If the pressure-related threshold has been met, the gas meter may send a control signal to a controller of a gas valve (e.g., a gas valve of the gas meter, a gas valve housed separately from the gas meter, and/or other suitable gas valve in communication with a flow through the gas line) to cause the gas valve to close or open and/or send a signal to a head-end system and/or utility to initiate a further action (e.g., an alarm, a valve closing, etc.). In another example, the gas meter may output the value related to the pressure of the gas flow to the head-end system and/or utility for further analysis as to what actions, if any, should be taken to address the potential pressure condition in the gas line. In another example the gas meter may display the value related to the pressure of the gas flow on the user interface 70 of the gas meter. These are just examples.

Figure 5:
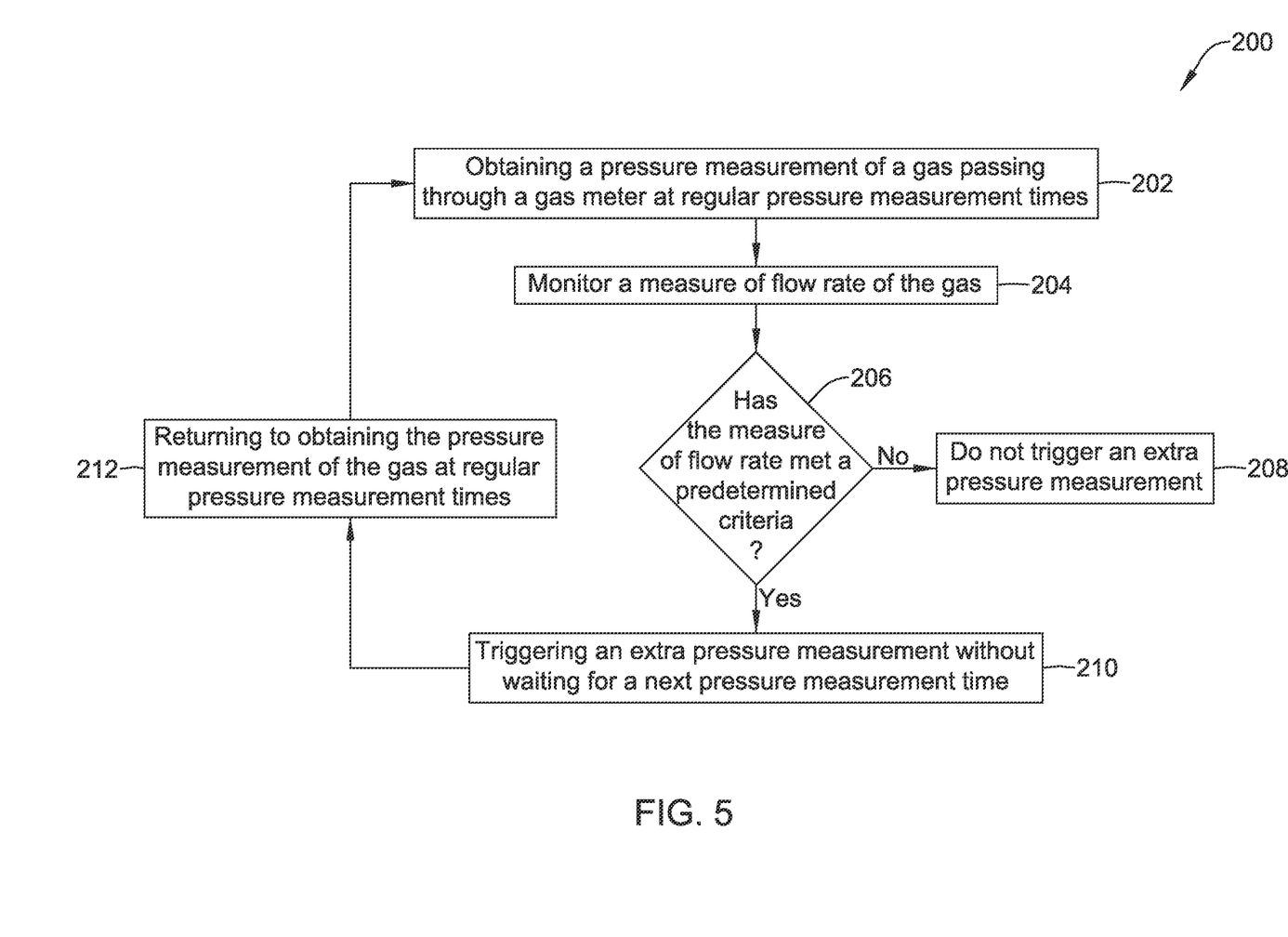
FIG. 5 is a schematic diagram of an illustrative method of operating a gas meter system.

FIG. 5 depicts a schematic flow diagram of an illustrative method 200 for controlling a gas meter (e.g., the gas meter 10 and/or other suitable gas meter) to monitor pressure in a gas line using one or more pressure sensors (e.g., the pressure sensor 44, the pressure sensor 62, and/or other suitable pressure sensor) to take a measurement of or indicative of a pressure of a gas passing through the gas meter and/or a gas line (e.g., the gas line 6 and/or other suitable gas lines). The gas meter may also include one or more flow sensors (e.g., the flow rate sensor 58 and/or other suitable flow sensors) to sense a measure indicative of a flow rate of a flow passing through the gas meter and/or the gas line. Although FIG. 5 depicts the method 200 in a control loop, additional and/or alternative steps are contemplated including, but not limited to outputting a control signal to cause a valve to close or open if a pressure measurement (e.g., a pressure measurement taken at a regular pressure measurement time and/or an extra measurement) is indicative of a pressure condition in the gas line and/or in response to flow rate sensor measurements, as desired.

In some cases, the method 200 may be entirely or at least partially executed using the gas meter, but this is not required. A controller (e.g., the host microcontroller 52, the USM microcontroller 50, and/or other suitable controllers) of the gas meter may be configured to entirely or at least partially initiate sensor measurements, make calculations, make determinations, initiate control signals, and/or take one or more other suitable actions to effect the method 200.

In the illustrative method 200, a pressure measurement of a gas passing through the gas meter may be obtained 202 (e.g., automatically repeatedly obtained) at a regular pressure measurement interval and/or time. Example regular pressure measurement intervals and/or times may include, but are not limited to, every thirty (30) seconds, every minute, every two (2) minutes, every three (3) minutes, every five (5) minutes, every ten (10) minutes, and/or other suitable times or intervals.

The obtained pressure measurements may be obtained from one or more pressure sensors (e.g., the pressure sensor 44, the pressure sensor 62, and/or one or more other suitable pressure sensors). In one example, the pressure measurements may be obtained from and/or based on outputs from a first pressure sensor measuring an ambient pressure and a second pressure sensor measuring ambient pressure and gas line net pressure. Other suitable techniques and/or systems for measuring pressure in the gas line are contemplated.

In the illustrative method 200, a measure of the flow rate of the gas passing through the gas meter may be monitored 204. The measure of the flow rate of the gas passing though the gas meter may be a value based on an output of the flow sensor. Example values of the measure of the flow rate may be a current flow rate of the flow through the gas line, a slope of the flow rate through the gas line, an average of the flow rate through the gas line, etc. In some case, the flow sensor may be configured to sense and/or output measurements at one or more regular flow rate measurement times and/or intervals set via settings at the gas meter and/or other suitable locations. An example regular flow rate measurement time or interval may be every two (2) seconds and/or other suitable times or intervals.

The monitored measure of the flow rate of the gas may be compared to one or more predetermined flow rate criteria. Similar to that discussed above with respect to the illustrative method 100, the flow rate criteria may be any suitable criteria including, but not limited to, one or more thresholds. Example thresholds include a low flow rate threshold, a high flow rate threshold, a flow rate slope threshold, a flow rate average threshold, and/or one or more other suitable thresholds. In one example, the flow rate value determined may be a slope over a predetermined time period (e.g., a set amount of time, a set number of measurements, etc.) and may be compared to a flow rate slope threshold corresponding to a potential high pressure condition in the gas line. As a result of comparing of the measure of the flow rate of the gas to the predetermined flow rate criteria, a decision or determination 206 is made as to whether the determined flow rate value has satisfied the predetermined flow rate criteria. When the predetermined flow rate criteria corresponds to a threshold, it may be considered to be met when the measure of the flow rate of the gas meets and/or goes beyond the threshold.

When a decision has been made that the flow rate has not met the flow rate criteria, the controller of the gas meter may determine not to trigger 208 an extra pressure measurement by the pressure sensor in addition to and/or without waiting for a next regular pressure measurement time or interval. Not triggering an extra pressure measurement may facilitate reducing power consumption by the gas meter and/or reducing processing power requirements for the gas meter as the pressure sensor may be maintained and/or returned to a low or lower power measurement state between regular pressure measurement times and/or intervals.

When a decision has been made that the flow rate has met the flow rate criteria, the controller of the gas meter may trigger 210 an extra pressure measurement by the pressure sensor in addition to and/or without waiting for a next regular pressure measurement time or interval. In one example, if a decision is made that the determined flow rate value meets or exceeds a high pressure threshold value, the controller of the gas meter may send a control signal to cause or trigger the pressure sensor to take an extra pressure measurement in addition to or without waiting for a next regular pressure measurement time or interval. Triggering an extra pressure measurement may cause the pressure sensor to switch from the lower power sleep state that may be generally maintained between regular pressure measurement times or intervals to a higher power measurement state to facilitate the pressure sensor taking the extra pressure measurement.

In the illustrative method 200, once the extra pressure measurement has been obtained, the gas meter may return 212 to obtaining pressure measurements of the gas passing through the gas meter or gas line at the regular pressure measurement times and/or intervals. In some cases, returning to obtaining pressure measurements of the gas passing through the gas meter or gas line may include restarting an interval from the last pressure measurement taken according to the regular pressure measurement times, restarting an interval from the last pressure measurement taken (e.g., from a time at which the extra pressure measurement was taken, and/or at one or more other suitable times). Triggering the extra pressure measurement when flow rate values are indicating a pressure condition of interest (e.g., a high pressure condition or low pressure condition) may be present in the gas line and returning to obtaining pressure measurements at regular pressure measurement time may facilitate monitoring pressure in the gas line using energy efficient techniques, while meeting or exceeding latency or response time requirements and/or guidelines for gas line pressure monitoring.

Based, at least in part, on one or more extra pressure measurements that are obtained from (e.g., outputted from) the pressure sensor, a value related to a pressure of the gas flow in the gas line may be determined (e.g., similar to determining 112 the value related to the pressure of the gas flow in the gas line discussed above with respect to the illustrative method 100 and/or determined in or more other suitable manners). In one example, the value related to the pressure of the gas flow may be used by the gas meter to determine if a pressure-related threshold has been met and if the pressure-related threshold has been met, the gas meter may send a control signal to a controller of a gas valve to cause the gas valve to close or open and/or send a control signal to a head-end system (e.g., the remote unit 12 and/or other suitable remote unit) and/or utility to initiate a further or another action (e.g., an alarm, a valve closing, etc.). In another example, the gas meter may output the value related to the pressure of the gas flow to the head-end system and/or utility for further analysis as to what actions, if any, should be taken to address the potential pressure condition in the gas line. In some cases, the head-end system may output a control signal to close a control and/or safety valve of the gas line in response to receiving the determination that the pressure-related threshold has been met. These are just examples.

Figure 6:
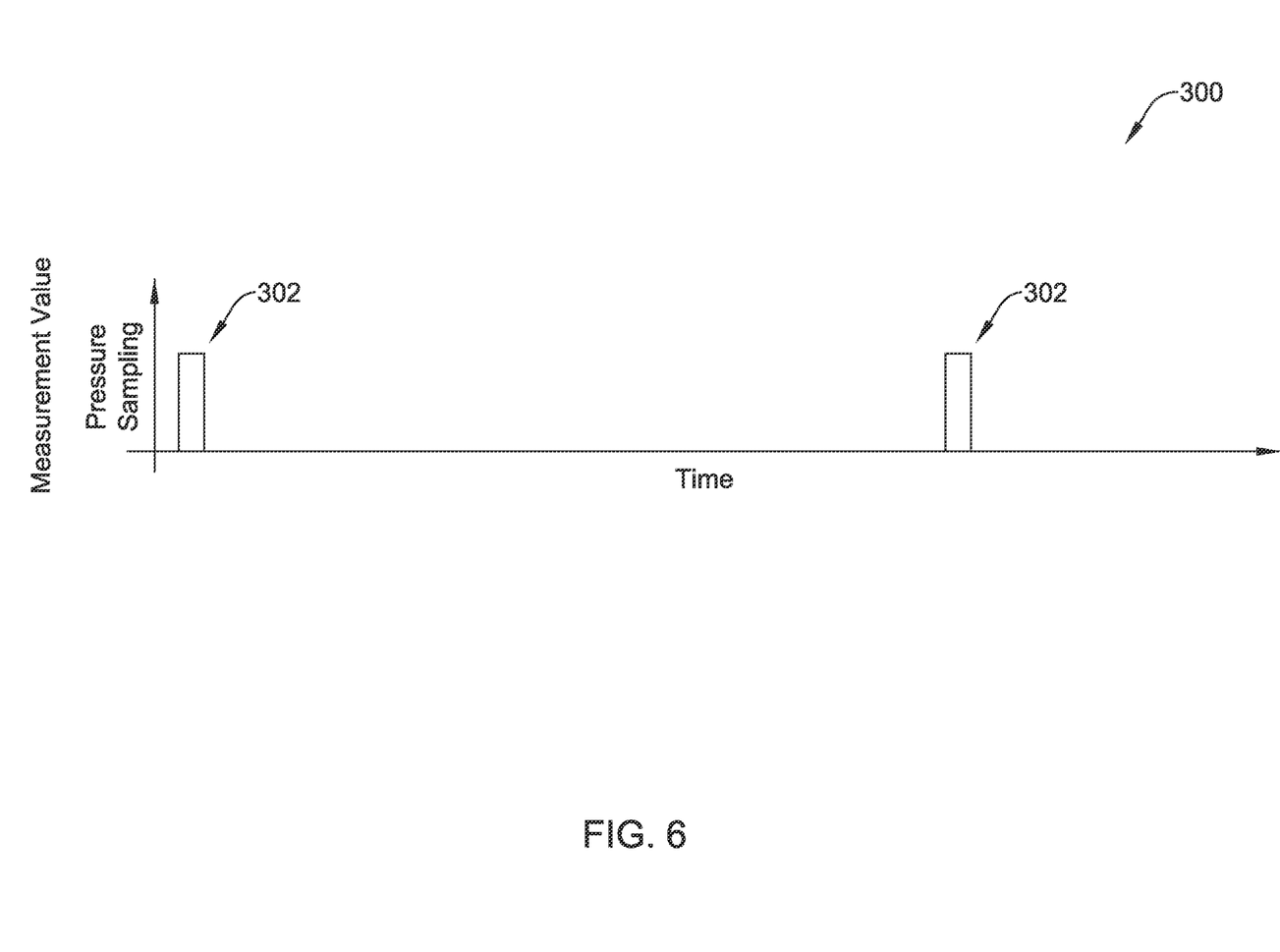
FIG. 6 is an illustrative timing chart of pressure measurements.

FIG. 6 depicts an illustrative timing chart 300 of when pressure measurements 302 are triggered or taken over time. In the timing chart 300, the pressure measurements 302 are taken at regular pressure measurement times or intervals. When pressure measurements are taken at the regular pressure measurement times or intervals, the gas meter system may have a constant, known reaction time for responding to pressure conditions. However, the constant, known reaction times can be longer than required or suggested for operating a safe gas line.

Figure 7:
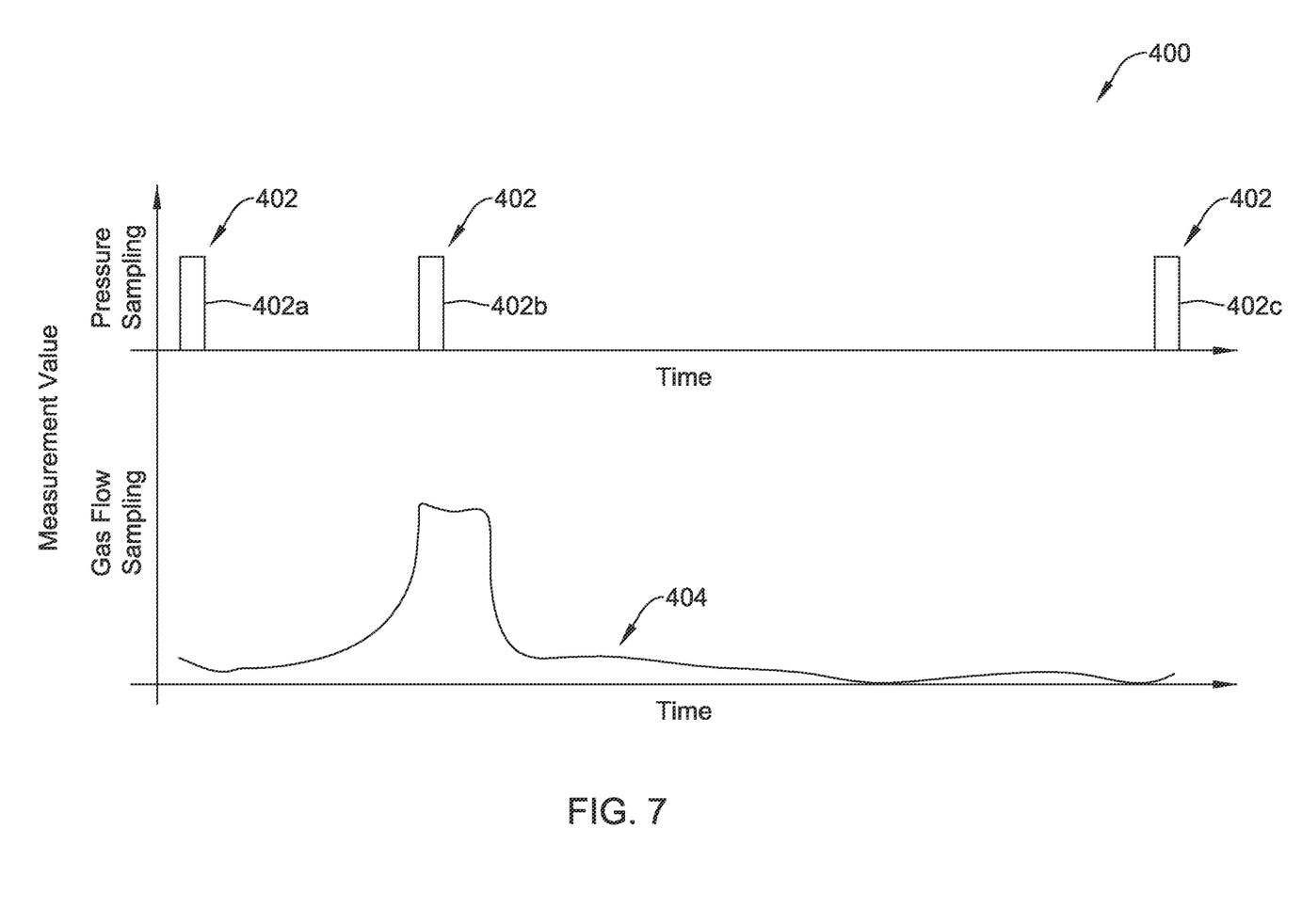
FIG. 7 is an illustrative timing chart of flow rate measurements and pressure measurements taken in accordance with an illustrative method of operating a gas meter.

FIG. 7 depicts an illustrative timing chart 400 of when pressure measurements 402 are triggered or taken over time and flow rate measurement values 404 taken over time. The flow rate measurement values 404 are represented with a continuous line due to the short interval (e.g., every two (2) seconds) between flow sensor measurements relative to the longer interval (e.g., every ten minutes) between regular pressure sensor measurements. The pressure measurements 402 and/or the flow rate measurement values 404 are triggered and/or taken at times that may be prescribed using the control techniques discussed herein (e.g., method 100, method 200, and/or other suitable techniques), but this is not required.

The timing chart 400 depicts a first pressure measurement 402*a* that may be initiated, taken, and/or triggered according to a regular pressure measurement time schedule or interval as the flow rate measurement values 404 are not indicating a potential pressure condition in the gas line. A second pressure measurement 402*b* may be initiated, taken, and/or triggered in response to the gas meter determining there is a potential pressure condition in the gas line or gas meter due to, for example as depicted, a rise in magnitude and/or slope of the flow measurement values. A third pressure measurement 402*c* may be initiated, taken, and/or triggered at a regular pressure measurement interval or time after (e.g., ten (10) minutes after) the last pressure measurement was taken (e.g., the pressure measurement 402*b*).

As may be inferred from the drop in flow measurement values 404 depicted in FIG. 7, a control action to close (e.g., entirely or at least partially close) a valve in communication with the gas line may have been taken in response to the pressure measurement value 402(*b*) and/or the high magnitude of or sharp rise in slope of the flow measurement values 404. Although not depicted, when a valve closing or other control action is taken that eliminates or reduces a chance of a pressure condition of interest propagating downstream of the gas valve, the regular pressure measurement time or interval may be switched from an active time or interval to an inactive time or interval. The inactive time or interval may be longer than the active time or interval. For example, the inactive time or interval may be twenty (20) minutes, thirty (30) minutes, sixty (60) minutes and/or other suitable amount of time.

Although FIGS. 4 and 5 depict various methods for monitoring flow rates and pressure in a gas line, and in some cases controlling valves and other operations involving a gas meter, others are also contemplated. Although specific embodiments have been illustrated and described herein, those of ordinary skill in the art will appreciate that any arrangement calculated to achieve the same result can be substituted for the specific embodiments shown. This disclosure is intended to cover any and all adaptations or variations of various embodiments of the disclosure.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A gas measuring system comprising:
a flow rate sensor configured to sense a measure of flow rate of a gas passing through a gas line;
a pressure sensor configured to sense a measure of pressure of the gas passing through the gas line, the pressure sensor having a lower power state and a higher power measurement state;
a controller in communication with the flow rate sensor and the pressure sensor, wherein the controller is configured to:
determine when the measure of flow rate of the gas passing through the gas line sensed by the flow rate sensor meets one or more predetermined flow rate criteria, indicating a potential pressure condition in the gas line;
repeatedly activate the pressure sensor to the higher power measurement state from the lower power state and obtain a pressure measurement of the measure of pressure of the gas passing through the gas line according to a regular pressure measurement time schedule or interval while the measure of flow rate of the gas passing through the gas line sensed by the flow rate sensor does not indicate the potential pressure condition in the gas line; and
in response to the measure of flow rate of the gas passing through the gas line sensed by the flow rate sensor indicating the potential pressure condition in the gas line, activate the pressure sensor to the higher power measurement state from the lower power state and obtain an extra pressure measurement without waiting for a next regular pressure measurement time and determine a value related to the pressure of the gas flow.

2. The gas measuring system of claim 1, wherein the controller is configured to cause a gas valve in the gas line to close when the measure of pressure of the gas passing through the gas line exceeds a predetermined pressure threshold.

3. The gas measuring system of claim 2, wherein the flow rate sensor, the pressure sensor and the controller are part of a gas meter, and the gas valve is separately housed from the gas meter.

4. The gas measuring system of claim 3, wherein the controller of the gas meter is configured to send a command to a controller of the gas valve when the measure of pressure of the gas passing through the gas line exceeds a predetermined threshold pressure, wherein the command causes the controller of the gas valve to close the gas valve.

5. The gas measuring system of claim 1, wherein the regular pressure measurement times are spaced apart in time by at least 1 minute.

6. The gas measuring system of claim 1, wherein the one or more predetermined flow rate criteria comprise a flow rate slope that exceeds a flow rate slope threshold value.

7. The gas measuring system of claim 1, wherein the one or more predetermined flow rate criteria comprise a flow rate magnitude that exceeds a flow rate magnitude threshold value.

8. The gas measuring system of claim 1, wherein after the controller obtains the extra pressure measurement, the controller resumes repeatedly obtaining the pressure measurement of the measure of pressure of the gas passing through the gas line at the regular pressure measurement time schedule or interval.

9. The gas measuring system of claim 1, wherein the controller resets the regular pressure measurement time schedule or interval to begin at the extra pressure measurement.

10. The gas measuring system of claim 1, wherein the controller is configured to maintain the pressure sensor in the lower power state between the regular pressure measurement times except when the extra pressure measurement is obtained after which the controller returns the pressure sensor to the lower power state.

11. A gas meter comprising:
a flow rate sensor configured to sense a measure of flow rate of a gas passing through the gas meter;
a pressure sensor configured to sense a measure of pressure of the gas passing through the gas meter, the pressure sensor having a lower power state and a higher power measurement state;
a controller in communication with the flow rate sensor and the pressure sensor, wherein the controller is configured to:
determine when the measure of flow rate of the gas passing through the gas line sensed by the flow rate sensor meets one or more predetermined flow rate criteria, indicating a potential pressure condition in the gas line;
activate the pressure sensor to the higher power measurement state from the lower power state and obtain a pressure measurement of the measure of pressure of the gas passing through the gas meter at each of a plurality of regular pressure measurement times while the measure of flow rate of the gas passing through the gas line sensed by the flow rate sensor does not indicate the potential pressure condition in the gas line;
wherein;
in response to the measure of flow rate of the gas passing through the gas line sensed by the flow rate sensor meeting the one or more predetermined flow rate criteria, activate the pressure sensor to the higher power measurement state from the lower power state and obtain an extra pressure measurement without waiting for a next regular pressure measurement time and determine a value related to the pressure of the gas flow; and when the measure of flow rate of the gas passing through the gas line sensed by the flow rate sensor does not meet the one or more predetermined flow rate criteria, not activating the pressure sensor to the higher power measurement state from the lower power state and obtaining an extra pressure measurement.

12. The gas meter of claim 11, wherein the controller is configured to maintain the pressure sensor in the lower power state between the regular pressure measurement times except when the extra pressure measurement is obtained after which the controller returns the pressure sensor to the lower power state.

13. The gas meter of claim 11, wherein the controller is configured to output a command when the measure of pressure of the gas passing through the gas meter exceeds a predetermined threshold pressure, wherein the command causes a gas valve in-line with the gas line to close.

14. The gas meter of claim 11, wherein the one or more predetermined flow rate criteria comprise one or more of a flow rate slope that exceeds a flow rate slope threshold value and a flow rate magnitude that exceeds a flow rate magnitude threshold value.

15. A non-transient computer readable medium storing instructions that when executed by a processor causes the processor to:

determine a value related to a flow rate of a gas flow based at least in part on a measure from a flow rate sensor sensing a measure related to the flow rate of the gas flow;

determine when the value related to the flow rate of the gas flow satisfies one or more predetermined flow rate criteria, indicating a potential pressure condition;

at each of a plurality of regular pressure measurement times, and while the value related to the flow rate of the gas flow does not satisfy the one or more predetermined flow rate criteria, activate a pressure sensor to a higher power measurement state from a lower power sleep state and determine a value related to a pressure of the gas flow;

when the value related to the flow rate of the gas flow does satisfy the one or more flow rate criteria, indicating the potential pressure condition, activate the pressure sensor to the higher power measurement state from the lower power sleep state without waiting for a next regular pressure measurement time and determine a value related to the pressure of the gas flow; and when the value related to the flow rate of the gas flow does not satisfy the one or more flow rate criteria, leaving the pressure sensor in a lower power sleep state until reactivated to the higher power measurement state for the next regular pressure measurement time.

16. The non-transient computer readable medium of claim 15, wherein the instructions cause the processor to determine the value related to the flow rate of the gas flow at a predetermined interval.

17. The non-transient computer readable medium of claim 15, wherein the value related to the flow rate corresponds to a slope of the flow rate, and the one or more flow rate criteria comprise the slope of the flow rate exceeding a threshold slope.

18. The non-transient computer readable medium of claim 15, wherein the value related to the flow rate corresponds to a magnitude of the flow rate, and the one or more flow rate criteria comprise the magnitude of the flow rate exceeding a threshold slope.

19. The non-transient computer readable medium of claim 15, wherein the instructions cause the processor to determine the value related to the pressure of the gas flow based on an output from a first pressure sensor and an output from a second pressure sensor.

20. The non-transient computer readable medium of claim 19, wherein the first pressure sensor is configured to sense a pressure of the gas flow and ambient pressure, and the second pressure sensor is configured to sense an ambient pressure.

* * * * *